Robert L. Fowler
Nickolas Prince, Jr.
INVENTORS.

Robert L. Fowler
Nickolas Prince, Jr.
 INVENTORS.

Robert L. Fowler
Nickolas Prince, Jr.
INVENTORS.

TIME CODE READER

SHAPER SECTION

SEPARATOR SECTION

CLOCK SECTION

Robert L. Fowler
Nickolas Prince, Jr.
INVENTORS.

STORAGE SECTION

CONTROL SECTION

Robert L. Fowler
Nickolas Prince, Jr.
INVENTOR.

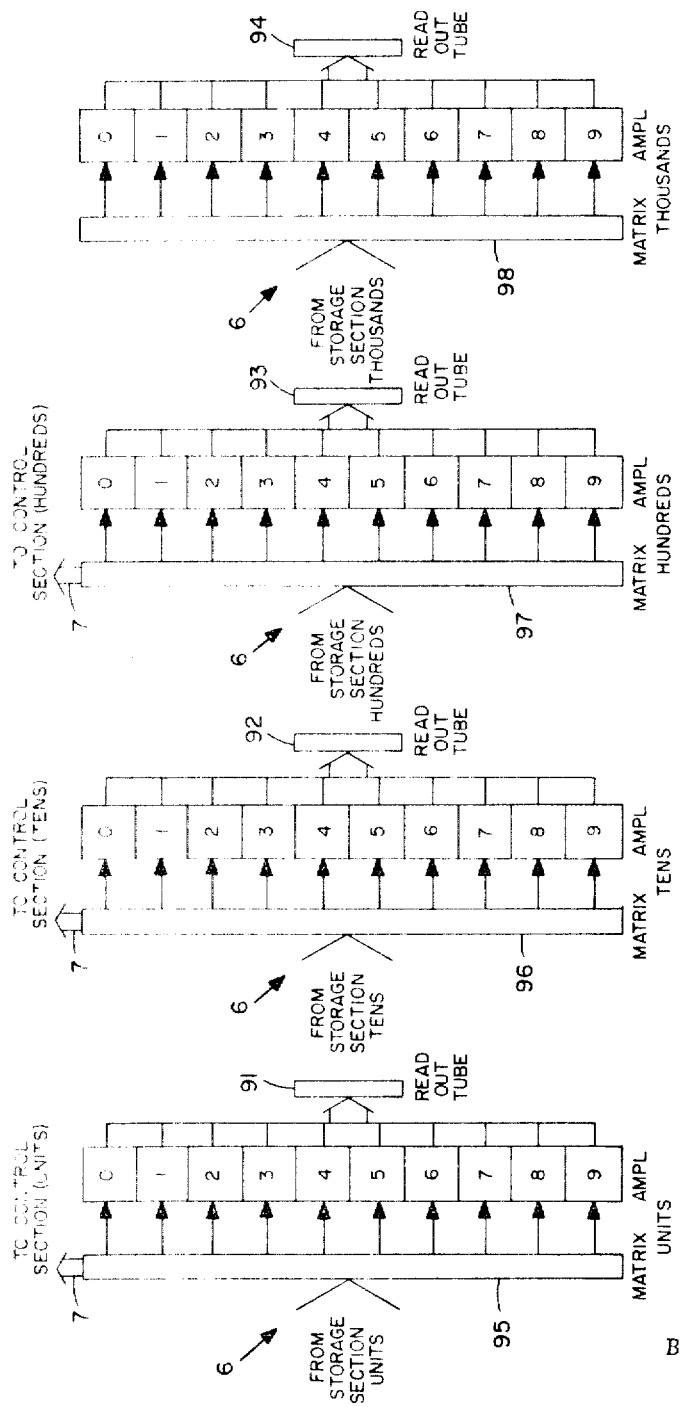

United States Patent Office

3,307,155
Patented Feb. 28, 1967

3,307,155
TIME CODE READER
Robert L. Fowler, China Lake, Calif., and Nickolas Prince, Jr., High Rolls, N. Mex., assignors to the United States of America as represented by the Secretary of the Army
Filed Mar. 11, 1964, Ser. No. 351,263
11 Claims. (Cl. 340—172.5)

The invention described herein may be manufactured and used by or for the Government for governmental purposes without the payment of any royalty thereon.

This invention relates to an electronic machine which will read and display the White Sands Missile Range G–2 time code and will also turn on and off at preselected times other devices as desired.

When test data is recorded on magnetic tape, the White Sands Missile Range G–2 time code is also recorded. This time code is recorded to give time correlation between recording stations and also time correlation to specific events (such as missile takeoff, separation, etc.). Then the data is played back at a data reduction center. However, only specific parts of the recorded data are usually required for reduction purposes; therefore a method for location of these parts on the tape is necessary. A desirous device would be one that would read and display the afore-mentioned G–2 time code.

It is therefore an object of this invention to provide a simplified time code reader which can perform all the normal functions of previous time code readers (such as reading and recording pictures, events and various types of intelligible signals from film, tape, and wire) during a selected period or periods of time.

Another object of the invention is to read both the G–2 time code and also be able to read other time codes which have a basic time rate of 100 pulses per second of which the code is in a binary coded decimal form.

A further object of the invention is to provide a simplified time code reader which can perform all the normal functions of previous time code readers but is both more reliable and cheaper than previous time code readers.

These and other objects and advantages of the present invention will become apparent from the following detailed description and from the accompanying drawings, in which:

FIGURE 11 is a block diagram of the read out section of the invention; and

Figure 1:
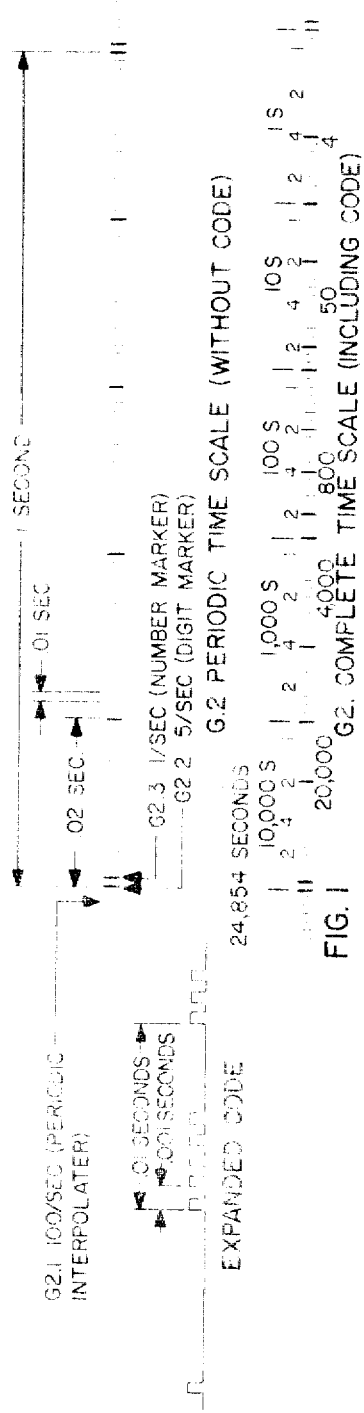
FIGURE 1 illustrates wave forms of the G–2 time code, wherein the abscissa is time and the ordinate is voltage.

An understanding of the G–2 time code is necessary before the philosophy of the circuit of this invention can be described. The code is shown in FIGURE 1. The periodic time scale identifies 0.01, 0.2 and 1 second scales as G2.1, G2.2 and G2.3 respectively. G2.1 is the continuous train of single 0.5 ms. pulses. G2.2 is indicated by a 5 pulse group. G2.3 is a pair of consecutive 5 pulse groups. Code groups are 3 pulse group.

Elapsed time is indicated each second as a five digit decimal number which refers to the time at the second marker preceding the number.

The basic repetition rate of the code is 100 pulses persecond. Code recycling time is 100,000 seconds (in excess of 24 hours). The seconds are separated by the number marker, which is two consecutive five pulse groups. For zero start operation the number marker (designated G2.3) and the code will be omitted prior to zero time. The second is then divided into five equal parts by the digit marker, which is a group of five pulses. Between the digit markers is the actual code in a binary coded decimal (hereinafter referred to as "BCD") form. This BCD has a 2–4–2–1 weighting and appears as a burst of three pulses at .03, .08, .13 and .18 second after the digit markers if the number is present. That is, if the decimal number were seven, there would be a group of three pulses at .03, .08 and .18 second after the digit marker. The decimal number is then multiplied by $10^n$, where $n$ is 4 for the number in the first digit group after the number marker, and $n$ is 0 for the last digit group.

Figure 6:
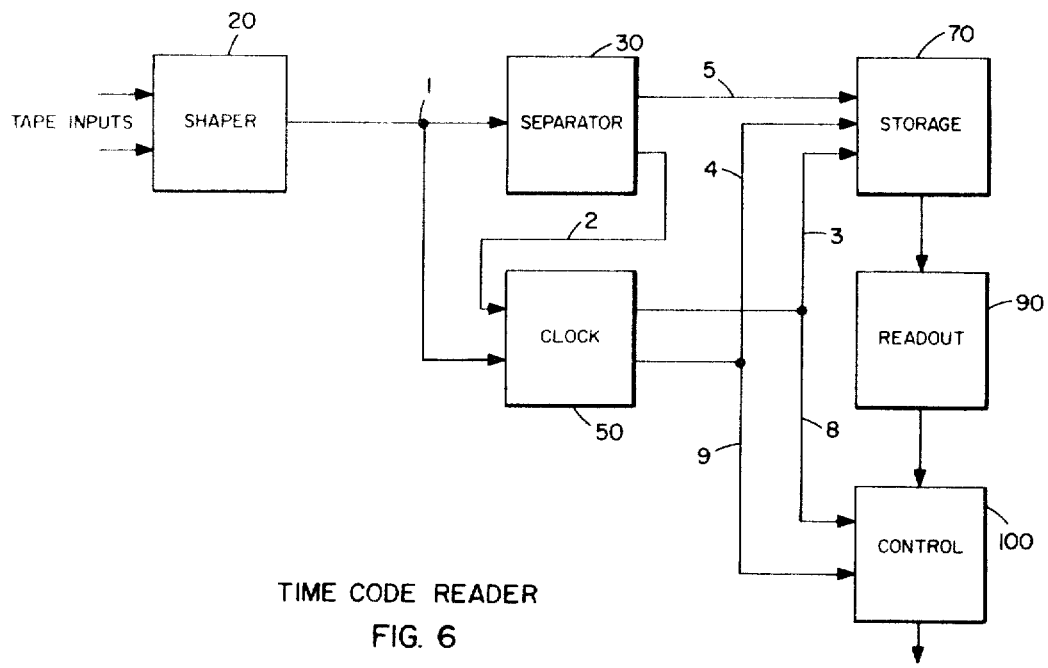
FIGURE 6 is a block diagram of a time code reader according to the present invention.

A machine that will read and display the aforementioned code will then have to perform six separate functions as shown in the overall block diagram of FIGURE 6. A shaper 20 having provisions for the different tape code inputs is shown as having its output connected to a junction 1. The shaper shapes the code into a standard wave-form. A separator section 30 separates the number markers, the digit markers, and the code groups into three different one-pulse groups and feeds them to leads 5 and 2. A clock section 50 having one input connected to junction 1 and a second input connected to lead 2 establishes a time base which is synchronized to range code each second. A storage section 70 having three inputs connected to leads 3, 4, and 5 takes coincidences between these inputs to set its flip-flops. A readout section 90 looks at the flip-flops in the storage section and displays its findings on Nixie readout tubes. A control section 100 having inputs 8 and 9 from the clock section and inputs from the output of the readout section takes coincidence at preselected times and then controls a relay to activate a data reduction process (not shown).

CIRCUIT DESCRIPTION

Figure 7:
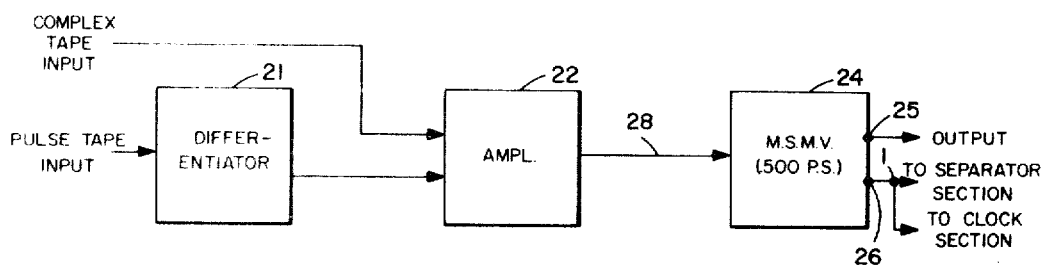
FIGURE 7 is a block diagram of the shaper section of the invention.

*Shaper section.—(Block Diagram FIGURE 7)*

The G–2 time code is available in two forms; one form as a complex with G–1 code as positive-going spikes and G–2 code as negative-going spikes; the other form as a .500 ms. pulse. The .500 ms. pulse form is connected to a differentiator 21 to be differentiated and then the pulse form is treated the same as the complex. The complex or the output from the differentiator 21 is amplified (negative half) and inverted by amplifier 22 (which is a grid limiting amplifier) so that we have 100-volt negative-going spikes output at lead 28. These spikes are used to trigger a monostable multivibrator 24 hereinafter set forth as MSMV. This gives pulse outputs at junctions 25 and 26 of 500 microseconds and an amplitude of 150 volts. Output 25 of MSMV 24 is brought out for an output for tape recorders, oscillographs, etc. (not shown). The other output 26 is fed to function 1 and to the separator circuit and to the clock circuit.

Figure 8:
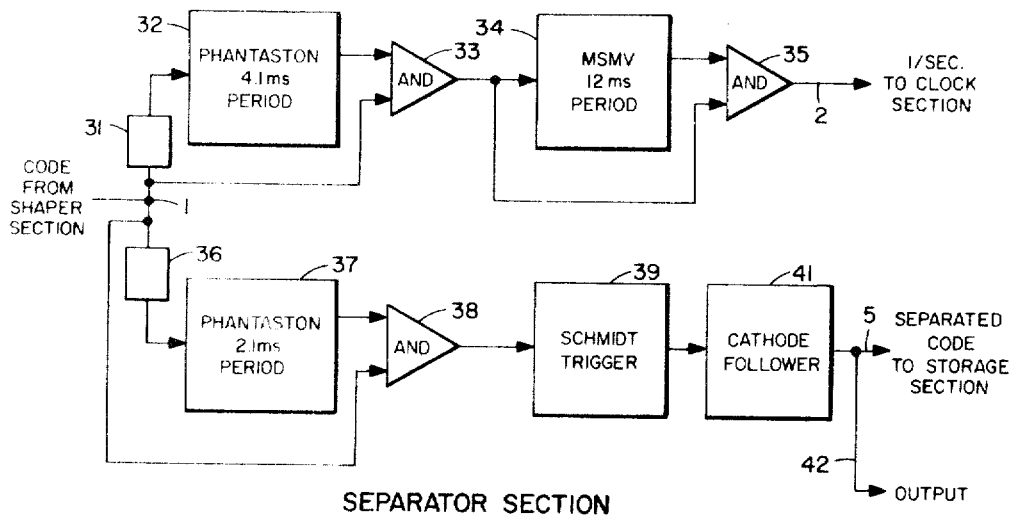
FIGURE 8 is a block diagram of the separator section of the invention.

*Separator section—(Block Diagram FIGURE 8)*

Figure 2:
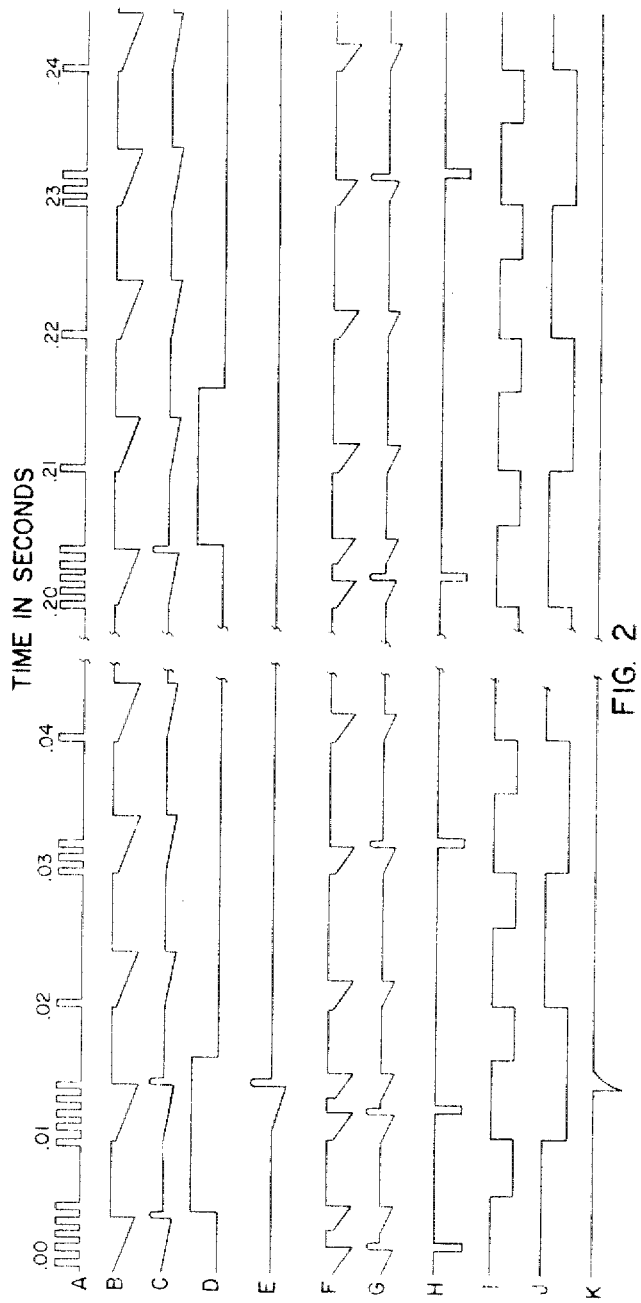
FIGURES 2–5 are wave forms of the invention, wherein the abscissa is time and the ordinate is voltage.

The code comes into the separator circuit (wave forms shown in FIGURE 2) from the shaper circuit, and then is differentiated by differentiator 31. The positive half signal passes so as to trigger a phantastron circuit 32 with a rundown time of 4.1 milliseconds (wave form FIGURE 2B). The output of the phantastron circuit is fed into an AND gate 33 along with the code pulses from junction 1; then if there are five pulses present, there will be a coincidence at the fifth pulse and an output (wave form FIGURE 2C). The output of AND gate 33 is used to trigger a monostable multivibrator 34 with a pulse width of 12 milliseconds (wave form FIGURE 2D). The output, together with its input, is fed into AND gate 25. The output at lead 2 of this gate (wave form FIGURE 2E) is sent to lead 2 of the clock circuit 50. Another phantastron circuit 37 with a rundown time of 2.1 milliseconds is triggered by the code (wave form FIGURE 2F) by way of differentiator 36. The output of circuit 37 goes into an AND gate 38 along with the code. This gives an output whenever there is a group of three pulses present; however, this makes no difference, as will be seen when the storage section is described. This output is used to trigger a Schmitt trigger 39 (wave form FIGURE 2H). The output of 39 is sent to a cathode follower 41 for impedance matching and then to lead 5 of the storage circuit. A lead 42 goes to an output circuit.

Figure 9:
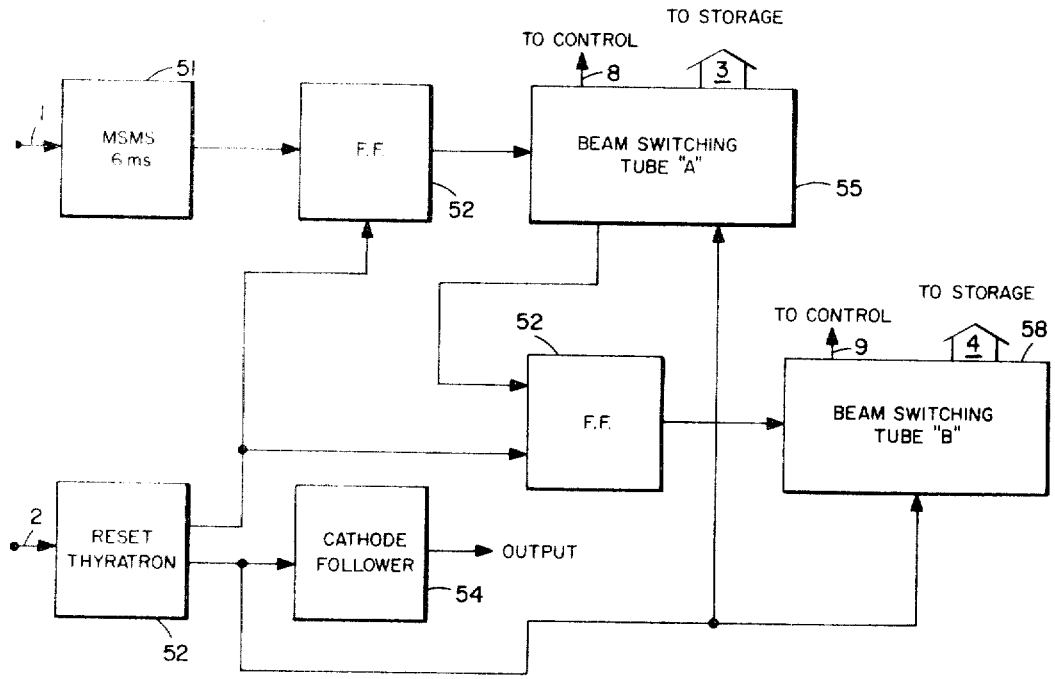
FIGURE 9 is a block diagram of the clock section of the present invention.

Clock section—(Block Diagram FIGURE 9)

Figure 10:
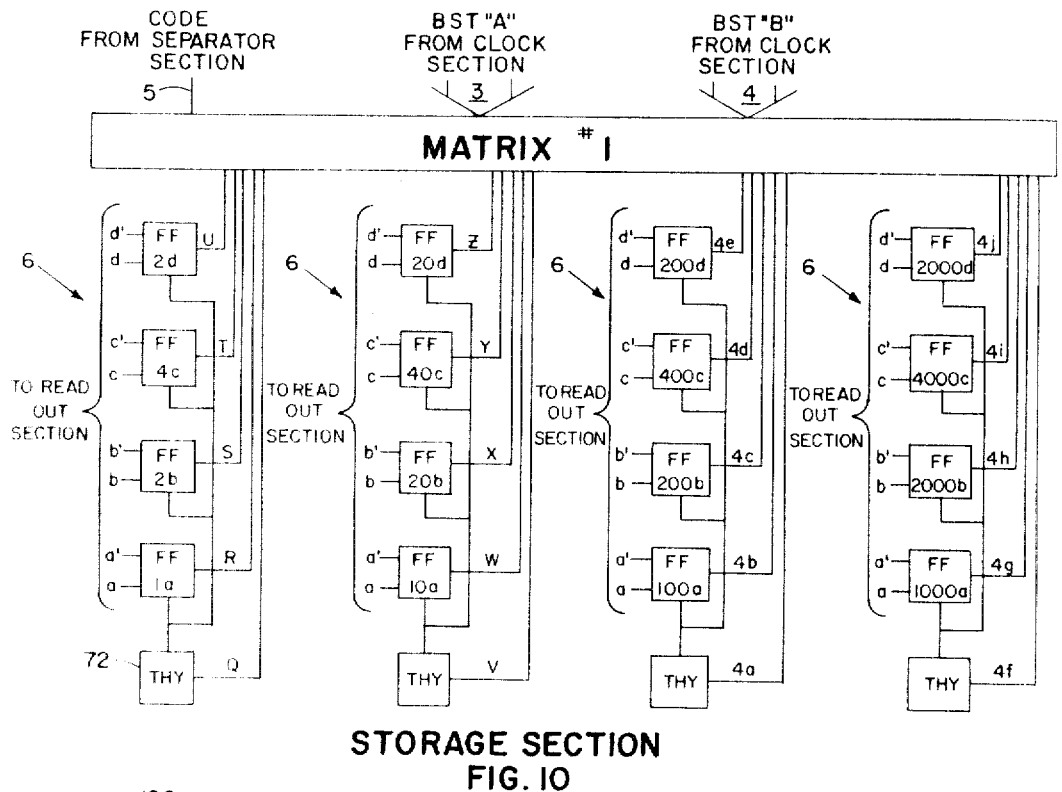
FIGURE 10 is a block diagram of the storage section of the invention.

The code comes from the shaper circuit 30 and junction 1 to trigger a monostable multivibrator 51 with a pulse width of 6 milliseconds (wave form FIGURE 2J). This then will allow the MSMV to be triggered at 100 per second rate. The output of 51 is differentiated and only the negative signal is passed to a flip-flop 52 (wave form FIGURE 2K). A reset thyratron 53 is triggered every second by the pulse output 2 of AND gate 35 in the separator circuit (wave form FIGURE 2L) This is used to reset flip-flop 52 to the proper state. The output of 53 also is fed through a cathode follower 54 to an output for a one-per-second pulse. Flip-flop 52 is the driver for the first beam-switching tube 55. This is a decade tube which is stepped at the hundred-per-second rate, making a complete revolution at a ten-per-second rate. Tube 55 is reset to one every second, thus bringing it into step with the incoming signal. The 3rd, 8th, and 0th targets (wave form FIGURES 3B, 3D and 3E) feed matrix 71 in storage section 70 by way of leads 3. The first target (wave form FIGURE 3C) is taken to the control circuit 100 by lead 8. Spade #0 of the tube 55 is used to drive a flip-flop 57. Flip-flop 57 is reset by 53. Flip-flop 57 drives another beam-switching tube 58 which rotates at a 10-per-second rate, thus making a complete cycle every second. Tube 58 is reset to 0 by reset thyratron 53 every second. Targets 2, 3, 4, 5, 6, 7, 8 and 9 of tube 58 (wave forms FIGURE 3F through 3O) are connected by way of leads 4 to matrix 71 (FIGURE 10 of the storage section). Target 1 is fed to the control circuit 100 by lead 9.

Storage section—(Block Diagram FIGURE 10)

Figure 3:
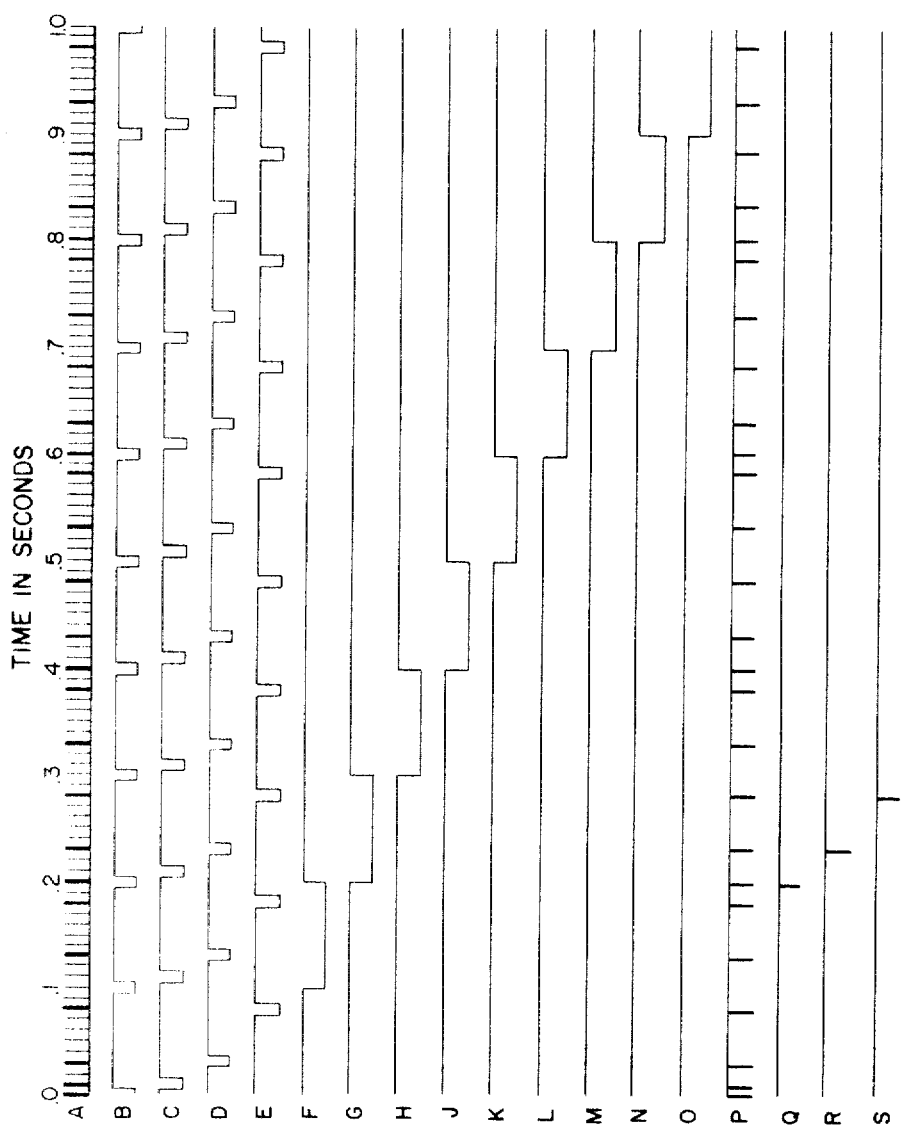
Figure 4:
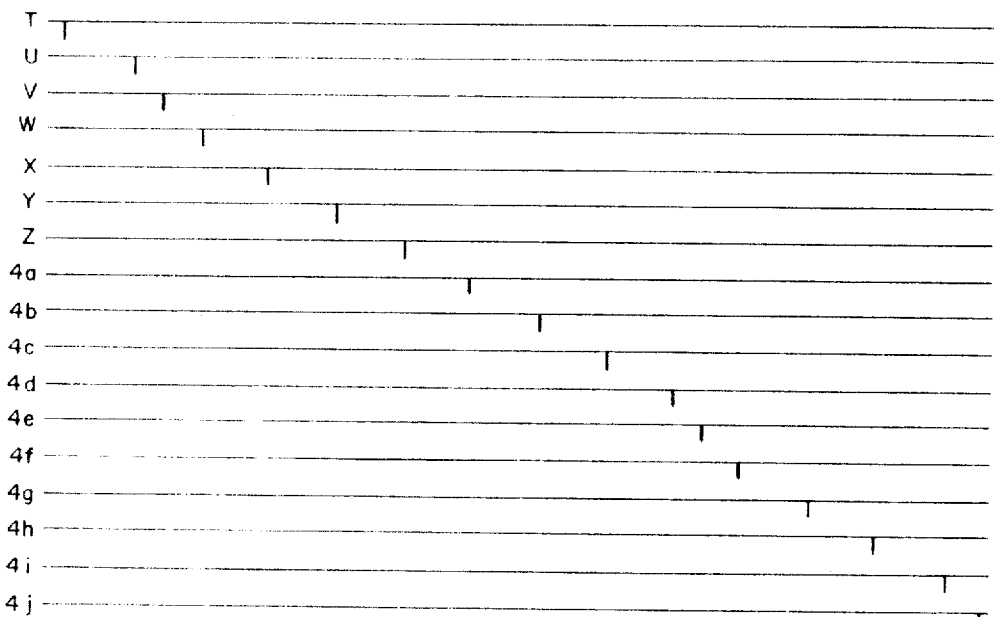

A matrix 71 finds coincidences between the code present pulses on lead 5 and the clock pulses (leads 3 and 4) and stores this information on separate flip-flops. The flip-flops are reset to zero at the digit marker just before the binary coded decimal number comes in. Matrix 71 is a series of AND gates which will give an output when all elements are present. The outputs of the matrix are shown in wave form in FIGURES 3Q, 3R, and 3S and in wave form in FIGURES 4T through 4J. Wave form FIGURE 3Q is used to the reset thyratron 72. This in turn returns flip-flops 1a, 2b, 4c and 2d to their "0" state. Wave form FIGURE 3R is a coincidence between beam switching tube (target #3), beam switching tube (target #2) and the code pulse (if present) and will switch flip-flop 1a to its "1" state. Wave form FIGURE 3S goes to flip-flop 2b, wave form 4T to flip-flop 4c and wave form 4U to flip-flop 2d. The rest of the thyratrons and flip-flops are similarly set up. The outputs of the flip-flops are fed by way of leads 6 to the input of the readout circuit.

Readout section—(Block Diagram FIGURE 11)

Figure 5:
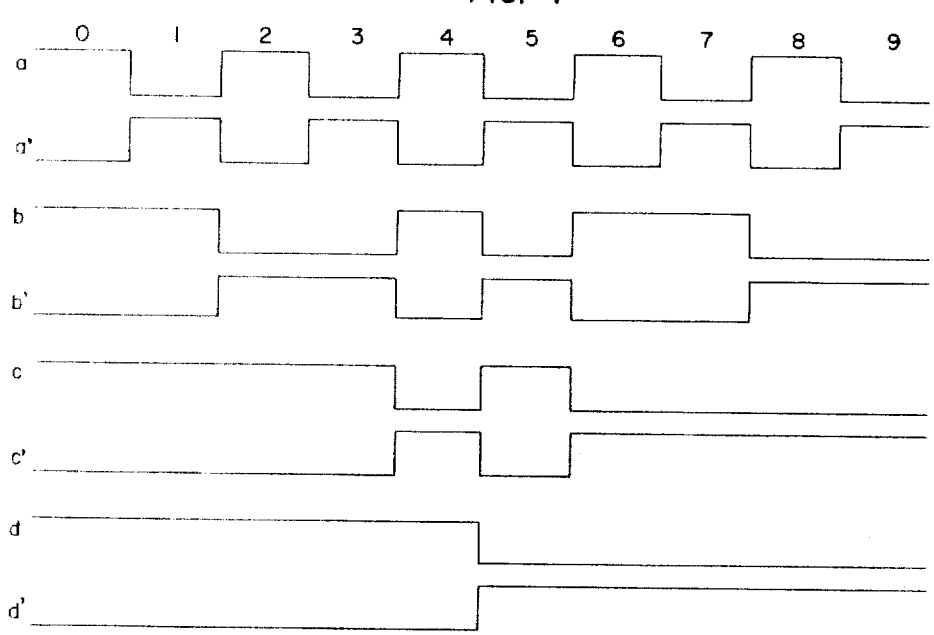

In this section there are four separate but identical sub sections which will take the information stored in storage circuit 70 and display it on numerical indicator tubes 91–94. Only one subsection will be described as the operation of the others are identical. FIGURE 5 shows the states of the storage flip-flops for any number. Flip-flops a are the 1, flip-flops b are the 2, flip-flops c are the 4 and flip-flops d are the 2; then to get any number, a set of coincidences is taken. Let a be the "0" state of flip-flops a and a' the "1" state, etc. Then the coincidences required are as follows:

| Number | Coincidences | Reduced Coincidences |
|---|---|---|
| 0 | a b c d | a b c |
| 1 | a' b c d | a' b c |
| 2 | a b' c d | a b' c |
| 3 | a' b' c d | a' b' d |
| 4 | a b c' d | c' d |
| 5 | a' b' c' d' | c d' |
| 6 | a b c' d' | a b d' |
| 7 | a' b c' d' | a' b d' |
| 8 | a b' c' d' | a b' d' |
| 9 | a' b' c' d' | a' b' c' |

The first column gives the decimal number, the second the "bute force" coincidences and the third the minimum necessary without ambiguity. The output from the matrix then goes to the grid of an amplifier tube which has a number of a numerical indicator tube such as a Nixie readout tube. When there is no output from the matrixes 95–98, the tubes 91–94 are cut off; so no display. When there is an output from a matrix, the corresponding tube conducts and so lights a number. Matrixs 95–97 also feed the control circuit by way of leads 7.

Figure 12:
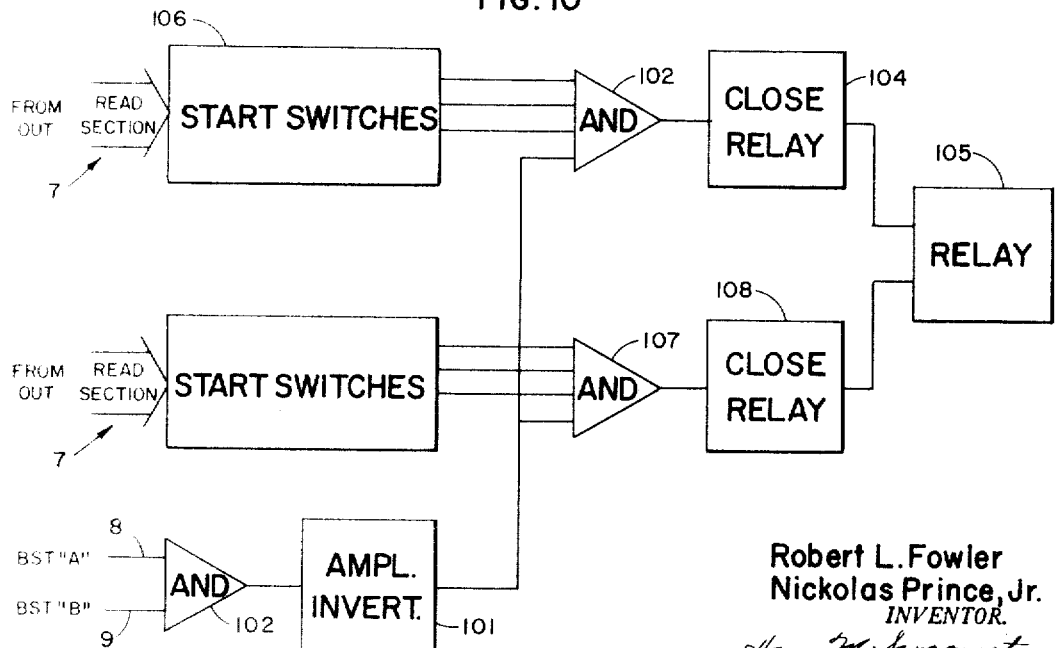
FIGURE 12 is a block diagram of the control section of the invention.

Control section.—(Block Diagram FIGURE 12)

This section gets its inputs from the matrixes 95–97 in readout circuit 90 and also from target #1 of beam switching tube 55 and target #1 of beam switching tube 58. The matrix outputs are fed into a series of switches 106 (a switch for the units, tens and hundreds of seconds). This will give one positive pulse out of each switch. The outputs of the three start switches are fed into an AND gate; O3 with the control pulse. The control pulse is derived from a coincidence (on AND gate 102) between target #1 of beam switching tube 55 and target #1 of beam switching tube 58. This is then inverted by an amplifier inverter 101 to give a positive pulse. The coincidence of the switches and the control pulse gives a positive-going pulse to relay 104; this energizes relay 104. This in turn energizes relay 105, which is then held on by its own circuitry. Then the positive pulse ends, relay 104 opens, but relay 105 is held closed by its own contacts being closed. Another set of switches 107 sets another number which will give three outputs at once when the number is reached. These positive pulses, along with the control positive pulse, give a coincidence output for AND gate 107. This causes relay 108 to be activated. Relay 108 causes relay 105 to open. Relay 105 controls any desired apparatus; such as a data reduction apparatus.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claims.

We claim:
1. A time code reader comprising in combination an input signal fed to an input of a shaper circuit; a separator circuit having an input and two outputs; connections from an output terminal of said shaper circuit to the input of said separator circuit; a clock circuit having two input terminals and an output terminal; means connecting the output terminal of said shaper circuit to one of said input terminals of said clock circuit; connections from one output terminal of said separator circuit to the other input terminal of said clock circuit; a storage circuit having two inputs and an output; means connecting the other output of the separator circuit to one input of said storage circuit; means connecting the output terminal of said clock circuit to the other input of the storage circuit; and a readout circuit connected to the output of said storage circuit.

2. A time code reader as set forth in claim 1, wherein said shaper circuit is adapted to differentiate a pulse signal input and fed said signal through an amplifier means to a monostable multivibrator.

3. A time code reader as set forth in claim 2, wherein said shaper circuit is also adapted to feed a complex input signal directly to an input of said amplifier.

4. A time code reader as set forth in claim 1, wherein said separator circuit comprises first and second phantastron circuits having different rundown times; said first phantastron circuit connected to one input of a first AND gate; said second phantastron circuit being connected to one input of a second AND gate; means connecting the output terminal of said shaper circuit to each of said phantastron circuits and to another input of each of said AND gates; means connecting the output of said first AND gate to said one output terminal of said separator; a monostable multivibrator having its input connected to an output of said second AND gate, and its output connected to one input of a third AND gate; said third AND gate having a second input connected to the output of said second AND gate, and having an output connected to said other output of said separator circuit.

5. A time code reader as set forth in claim 1, wherein said clock circuit comprises a monostable multivibrator having its input connected to said shaper output and its output connected to a first input of a first flip-flop; said flip-flop having a second input and an output; the output of said flip-flop being connected to a first beam switching tube; a reset thyratron having an input connected to said other output of said separator and having first and second outputs; said first output being connected to said first beam switching tube and to a second beam switching tube; said second output of the reset thyratron being connected to the second input of said first flip-flop and to a first input of a second flip-flop; said second flip-flop having a second input connected to said first beam switching tube and an output connected to said second beam switching tube; and means connecting an output of each of said beam switching tubes to the other input of said storage circuit.

6. A time code reader as set forth in claim 1; wherein said storage circuit comprises a matrix having a first input connected to said one output of said separator circuit and a second input connected to the output terminal of said clock circuit; and said matrix having a plurality of outputs connected to an input of said readout circuit by way of a plurality of flip-flop means.

7. A time code reader as set forth in claim 1 further comprising a control circuit connected to the output terminal of said clock circuit and to an output terminal of said readout circuit.

8. A time code reader as set forth in claim 4, wherein said shaper circuit is adapted to differentiated pulse signal input and fed said signal through an amplifier means to a monostable multivibrator.

9. A time code reader as set forth in claim 8, wherein said shaper circuit is also adapted to feed a complex input signal directly to an input of said amplifier.

10. A time code reader as set forth in claim 9, wherein said storage circuit comprises a matrix having a first input connected to said one output of said separator circuit and a second input connected to the output terminal of said clock circuit; and said matrix having a plurality of outputs connected to an input of said readout circuit by way of a plurality of flip-flop means.

11. A time code reader as set forth in claim 10 further comprising a control circuit connected to the output terminal of said clock circuit and to an output terminal of said readout circuit.

No references cited.

ROBERT C. BAILEY, *Primary Examiner.*

G. D. SHAW, *Assistant Examiner.*